United States Patent [19]

Schwager

[11] 4,392,279
[45] Jul. 12, 1983

[54] SELF-LOCKING TWO-PART FASTENER

[75] Inventor: Frederic A. Schwager, Manhattan Beach, Calif.

[73] Assignee: Mattel, Inc., Hawthorne, Calif.

[21] Appl. No.: 301,495

[22] Filed: Sep. 14, 1981

[51] Int. Cl.³ .................. A44B 21/00; A44B 1/38; A63H 3/38
[52] U.S. Cl. .................. 24/221 R; 24/221 A; 24/109; 24/90.5; 46/165; 411/329; 403/349
[58] Field of Search ............ 24/67.1, 67.7, 90 E, 24/90.5, 94, 96, 97, 98, 109, 108, 206 B, 211 L, 211 P, 212, 221 R, 95, 110, 221 A, 221 K; 46/165, 170; 215/332, 334, 337, DIG. 3, 208, 216, 218; 292/303, 19; 403/349, 348; 411/329, 114

[56] References Cited

U.S. PATENT DOCUMENTS

| | | | |
|---|---|---|---|
| 2,118,561 | 7/1938 | Kleeberg | 24/90 E |
| 2,763,031 | 9/1956 | Rekettye | 18/58.3 |
| 2,777,249 | 1/1957 | Wagner | 46/165 |
| 2,799,971 | 7/1957 | Bradney | 46/165 |
| 2,991,588 | 7/1961 | Williams | 46/165 |
| 3,571,968 | 3/1971 | Samo | 46/135 |
| 3,871,128 | 3/1975 | Grooms | 46/165 |
| 3,881,272 | 5/1975 | Parker | 43/42.34 |
| 3,891,110 | 6/1975 | Gach | 215/216 |
| 3,895,730 | 9/1975 | Koehue | 215/216 |
| 3,989,152 | 6/1976 | Julian | 215/216 |
| 4,144,983 | 11/1979 | Pauls et al. | 215/216 |
| 4,233,776 | 2/1980 | Suzuki | 46/165 |
| 4,293,263 | 4/1981 | Zankl | 24/221 R |
| 4,331,413 | 7/1982 | Hoen | 24/221 R |

Primary Examiner—Gene Mancene
Assistant Examiner—John B. Weiss
Attorney, Agent, or Firm—Ronald M. Goldman; Max E. Shirk; Roy A. Ekstrand

[57] ABSTRACT

A first fastener part (14) includes a flat disc (16) from which a spindle (18) extends for engagement by a hollow tubular member (24) extending from a base (22) provided with an aperture (54) through which the free end of spindle (18) is visible. A pair of resilient fingers (28, 29) are formed integrally with disc (16) and are mounted in arcuate openings (46, 48) which are of greater extent than fingers (28, 29) so that protuberances (34, 36), which extend from the free end of hollow tubular member (24), will be trapped by the free ends of fingers (28, 29) when shoulders (40, 42), on tubular member (24), and cam faces (30, 32), on spindle (18), coact to couple spindle (18) and hollow tubular member (24) together.

6 Claims, 8 Drawing Figures

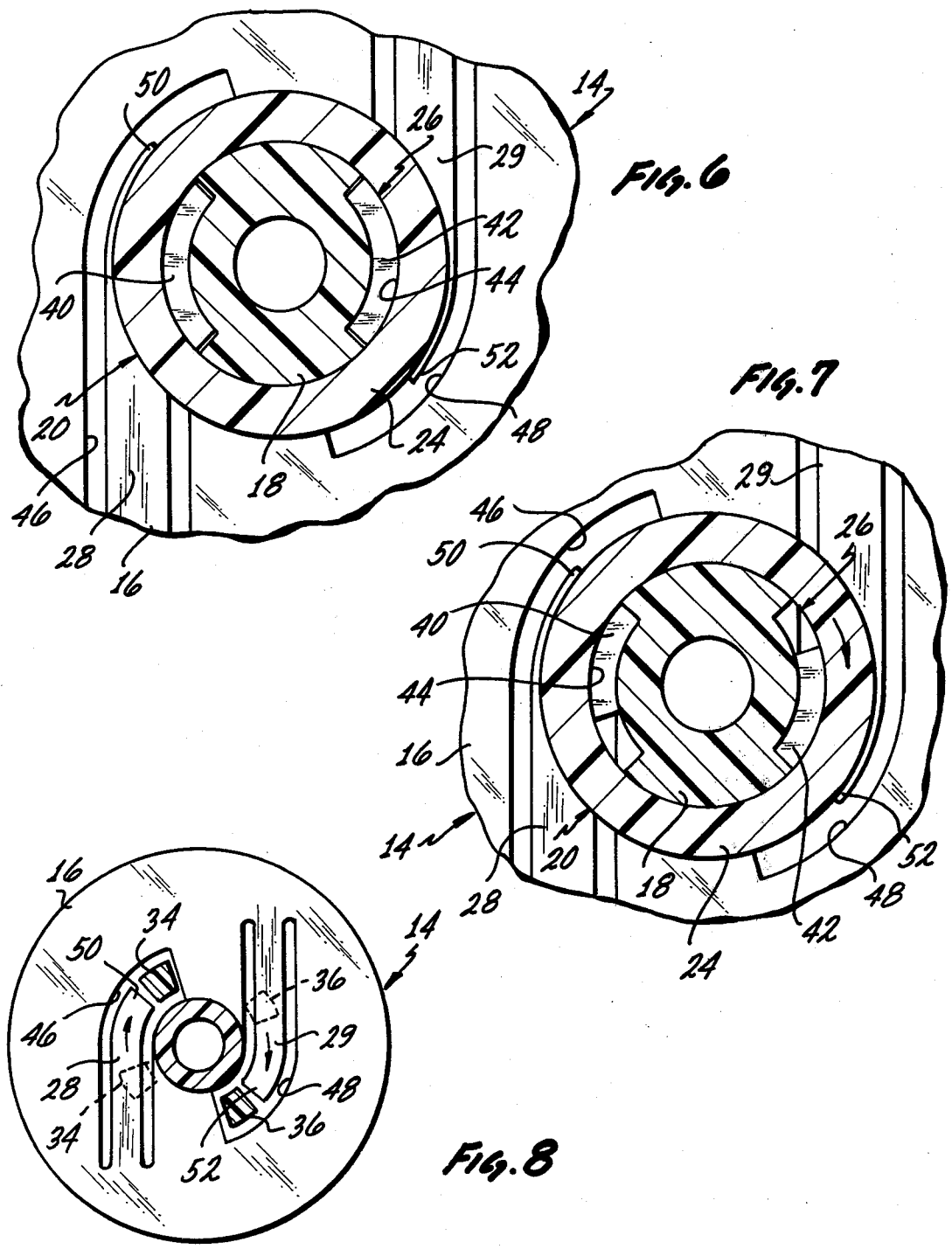

SELF-LOCKING TWO-PART FASTENER

DESCRIPTION

1. Technical Field

The present invention relates to fasteners and particularly to a new and useful self-locking two-part fastener suitable for use as a doll eye, a drawer pull or the like.

In providing simulated eyes for figure toys and particularly for figure toys of the type which have the simulated eyes affixed to the outer surface of the figure toy, it is essential to minimize the likelihood that a child of tender years will detach one of the simulated eyes and swallow it.

Additionally, in providing pulls for cabinet or furniture drawers and doors, it is desirable to have a pull which is inexpensive, durable and quickly mounted to the drawer or door.

2. Background Art

The prior art known to Applicant is of record in separate communications to the United States Patent and Trademark Office.

The present invention exemplifies improvements over this prior art.

SUMMARY OF INVENTION

According to the present invention, a self-locking, two-part fastener is provided. The fastener comprises a first fastener part including a first base and a spindle upstanding from the first base, a second fastener part including a second base and a hollow tubular member upstanding from the second base and a mechanism for locking the hollow tubular member to the spindle and to the first base.

The locking mechanism may include a resilient stop member on the first base, a cam face on the spindle, a protuberance extending from the hollow tubular member and a shoulder provided on the inner wall of the tubular member, whereby the spindle may be inserted into the hollow tubular member and rotated with respect thereto until the cam face and the shoulder force the protuberance into locked engagement with the stop member.

The resilient stop member may be formed integrally with the first base and may comprise a resilient finger mounted in an arcuate opening in the first base with the opening being of greater extent than the finger so that the protuberance may be trapped in the opening by the free end of the finger.

The first base may comprise a flat disc and the second base may be provided with an aperture and may be suitably arranged to simulate the iris of the eye on a figure toy with the free end of the spindle being positioned in the aperture when the fastener is mounted to the figure toy with the skin of the figure toy being trapped between the fastener parts.

The features of the present invention which are believed to be novel are set forth with particularity in the appended claims. The present invention, both as to its organization and manner of use, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 1 is an exploded perspective view showing a fastener of the present invention in combination with a suitable member such as a figure toy part, a cabinet drawer or the like;

FIG. 6 is an enlarged cross-sectional view taken along line 6—6 of FIG. 3;

FIG. 7 is an enlarged cross-sectional view taken along line 7—7 of FIG. 4; and

FIG. 8 is a cross-sectional view taken along line 8—8 of FIG. 5.

BEST MODE FOR CARRYING OUT THE INVENTION

Figure 1:
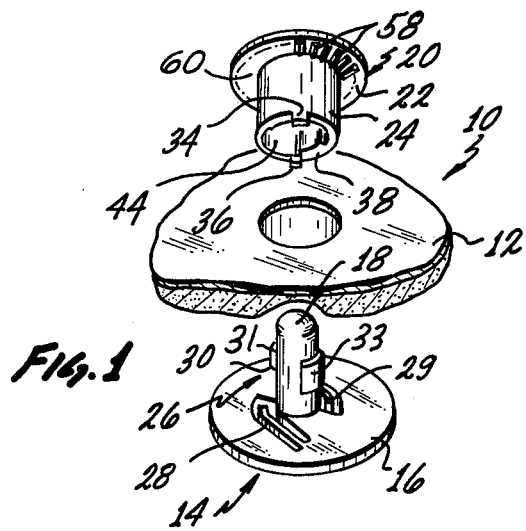
Figure 2:
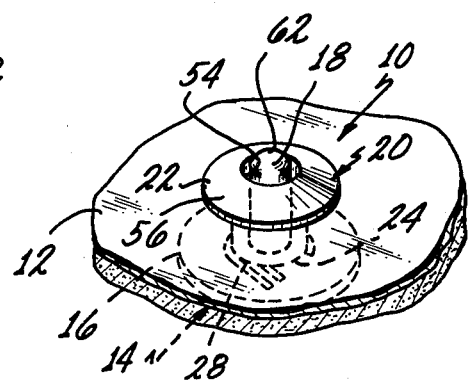
FIG. 2 is a perspective view showing the fastener of FIG. 1 in assembled relationship with the member of FIG. 1.

Referring again to the drawings a two-part fastener constituting a presently-preferred embodiment of the invention, generally designated 10, is shown in combination with a suitable member 12 (FIGS. 1 and 2) which may comprise the facial portion of a figure toy adjacent its eyes, a segment of a cabinet door, a segment of a dresser drawer or the like.

Fastener 10 comprises a first fastener part 14 including a first base 16 and a spindle 18 upstanding from base 16, a second fastener part 20 including a second base 22 and a hollow tubular member 24 upstanding from the second base 22 and a mechanism 26 for locking the hollow tubular member 24 to the spindle 18 and the first base 16.

Figure 5:
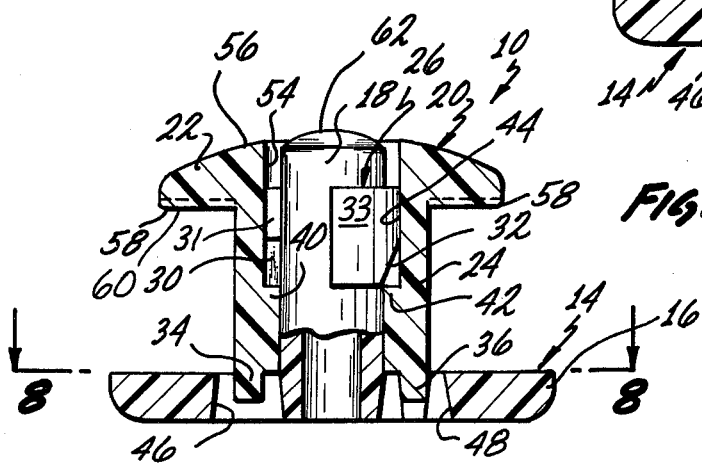

Locking mechanism 26 includes a pair of resilient stop members 28, 29 provided on a base 16, a pair of cam faces 30, 32 provided on locking tabs 31, 33, respectively, (FIGS. 1 and 5) carried by spindle 18, a pair of protuberances 34, 36 (FIGS. 1, 5 and 8) extending from the lower end 38 of hollow tubular member 24 and a pair of shoulders 40, 42 (FIGS. 3-7) provided on the inner wall 44 of tubular member 24. With this arrangement, spindle 18 may be inserted into tubular member 24 and rotated with respect thereto until cam faces 30, 32 and shoulders 40, 42 force protuberances 34, 36 into locked engagement with stop members 28, 29.

Stop members 28, 29 may be formed integrally with the first base 16 and comprise resilient fingers mounted in arcuate openings 46, 48, respectively, in base 16. Openings 46, 48 are of greater extent than fingers 28, 29 so that protuberances 34, 36 may be trapped in associated ones of the openings 46, 48 by the free ends 50, 52, respectively, (FIGS. 6-8) of fingers 28, 29.

Base 16 may comprise a flat disc and base 22 is preferably somewhat frusto-conical in shape with an aperture 54 provided in the upper surface 56 thereof (FIGS. 2-5) in communication with tubular member 24. Serrations 58 may be provided on the lower surface 60 of base 22 (FIGS. 1 and 3-5). With this arrangement, base 22 may be suitably decorated to simulate the iris-portion of the eye of a figure toy and the upper end 62 of spindle 18 may be decorated to simulate the pupil-portion of the eye of a figure toy. It will, of course, be apparent to those skilled in the art that base 22 may be decorated in any suitable manner to enhance its appearance when used as a drawer or door pull.

Use of fastener 10 is believed to be apparent from the foregoing and will be briefly summarized in connection with FIGS. 3-8 at this point.

Figure 3:
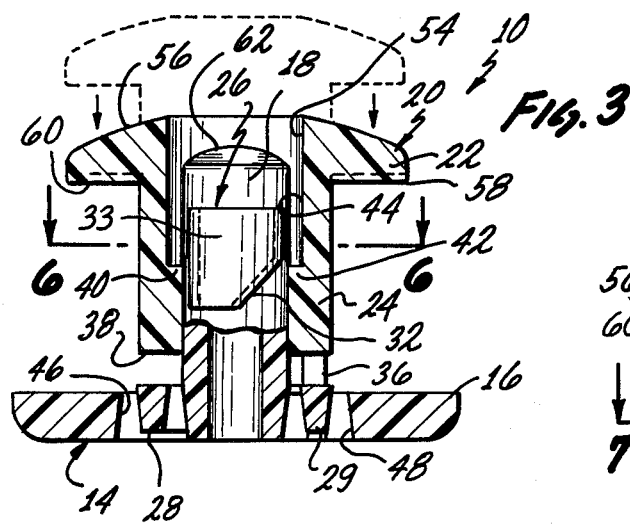
FIGS. 3, 4 and 5 are enlarged longitudinal cross-sectional views of the fastener of FIG. 1 during different stages of an assembly operation.
Figure 4:
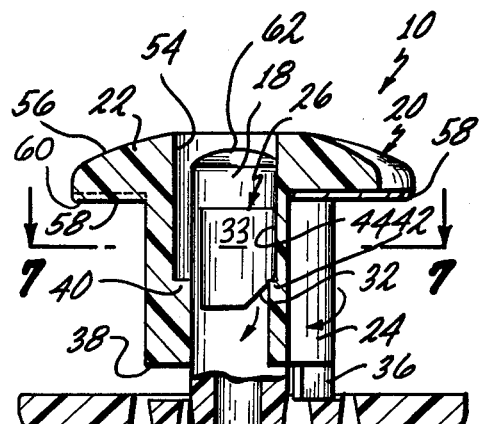

Spindle 18 on fastener part 14 may be inserted into hollow tubular member 24 on fastener part 20, as shown in FIG. 3. Fastener part 14 may then be held stationary while fastener part 20 is rotated in the direction of the arrows in FIGS. 4 and 7 until protuberances 34, 36 pass the free ends 50, 52 of fingers 28, 29, respectively, whereupon shoulders 40, 42 on tubular member 24 will coact with locking tab 31, 33 to prevent protuberances 34, 36 from moving past free ends 50, 52 upon reverse rotation of fastener parts 14, 20.

While the particular two-part fastener herein shown and described in detail is fully capable of attaining the objects and providing the advantages hereinbefore stated, it is to be understood that it is merely illustrative as the presently-preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. A self-locking two-part fastener, comprising:
a first fastener part including a first base and a spindle upstanding from said first base, said first base including a disc having an opening provided therein;
a second fastener part including a second base and a hollow tubular member upstanding from said second base; and
means for locking said hollow tubular member to said spindle and said first base, said locking means including a resilient stop member having one end affixed to said disc and a free end positioned within said opening, said opening being of greater extent than said stop member, a locking tab provided on said spindle, said locking tab including a cam face, a protuberance extending from said hollow tubular member, said protuberance being in alignment with said resilient stop member when said hollow tubular member encompasses said spindle, and a shoulder provided on the inner wall of said tubular member, whereby said spindle may be inserted into said hollow tubular member and rotated with respect thereto until said cam face and said shoulder force said protuberance to flex said stop member and move past said free end of said stop member, whereby said free end will return to its original position and said locking tab and said shoulder will coact to maintain said protuberance in alignment with said free end.

2. A self-locking two-part fastener, comprising:
a first fastener part including a first base and a spindle upstanding from said first base;
a second fastener part including a second base and a hollow tubular member upstanding from said second base, and
means for locking said hollow tubular member to said spindle and said first base, said locking means including a resilient stop member on said first base, a cam face on said spindle, a protuberance extending from said hollow tubular member and a shoulder provided on the inner wall of said tubular member, whereby said spindle may be inserted into said hollow tubular member and rotated with respect thereto until said cam face and said shoulder force said protuberance into locked engagement with said stop member, said stop member being formed integrally with said first base and comprising a resilient finger mounted in an arcuate opening in said first base, said opening being of greater extend than said finger, whereby said protuberance may be trapped in said opening by the free end of said finger.

3. A fastener as recited in claim 2 wherein said first base is a flat disc.

4. A fastener as recited in claim 3 wherein said second base includes a serrated surface simulating the eye of a figure toy.

5. A two-part fastener, comprising:
a first unitary fastener part including a flat disc having a pair of J-shaped openings provided therein, a resilient finger mounted to said disc in each of said openings, a spindle upstanding from said disc between said openings and a pair of cam faces provided on said spindle, said openings being of greater extent than said fingers, whereby a space is provided between the free end of each of said fingers and said disc; and
a second unitary fastener part including a base, a hollow cylindrical member upstanding from said base, a pair of protuberances extending from the free end of said cylindrical member and a pair of shoulders provided on the inner surface of said cylindrical member, whereby said spindle may be inserted into said cylindrical member and rotated until said cams and said shoulders force said protuberances to depress said fingers and become trapped in said spaces between the free ends of said fingers and said disc with said cams and said shoulders in abutting relationship.

6. A two-part fastener comprising:
a first fastener part including a first base and a spindle upstanding from said first base;
at least one resilient stop member provided on said base;
at least one cam face provided on said spindle;
a second fastener part including a second base and a hollow tubular member upstanding from said second base;
at least one protuberance extending from the free end of said hollow tubular member; and
at least one shoulder provided on the inner wall of said hollow tubular member, whereby said spindle may be inserted into said hollow tubular member and rotated with respect thereto until said cam face and said shoulder force said protuberance into locked engagement with said stop member, said spindle including an end which is decorated to simulate the pupil-portion of an eye for a figure toy, said second base being provided with an aperture in communication with said hollow tubular member, whereby said decorated end of said spindle is visible through said aperture when said hollow tubular member is assembled to said spindle, said second base being decorated to simulate the iris-portion of said eye.

* * * * *